Patented Jan. 4, 1927.

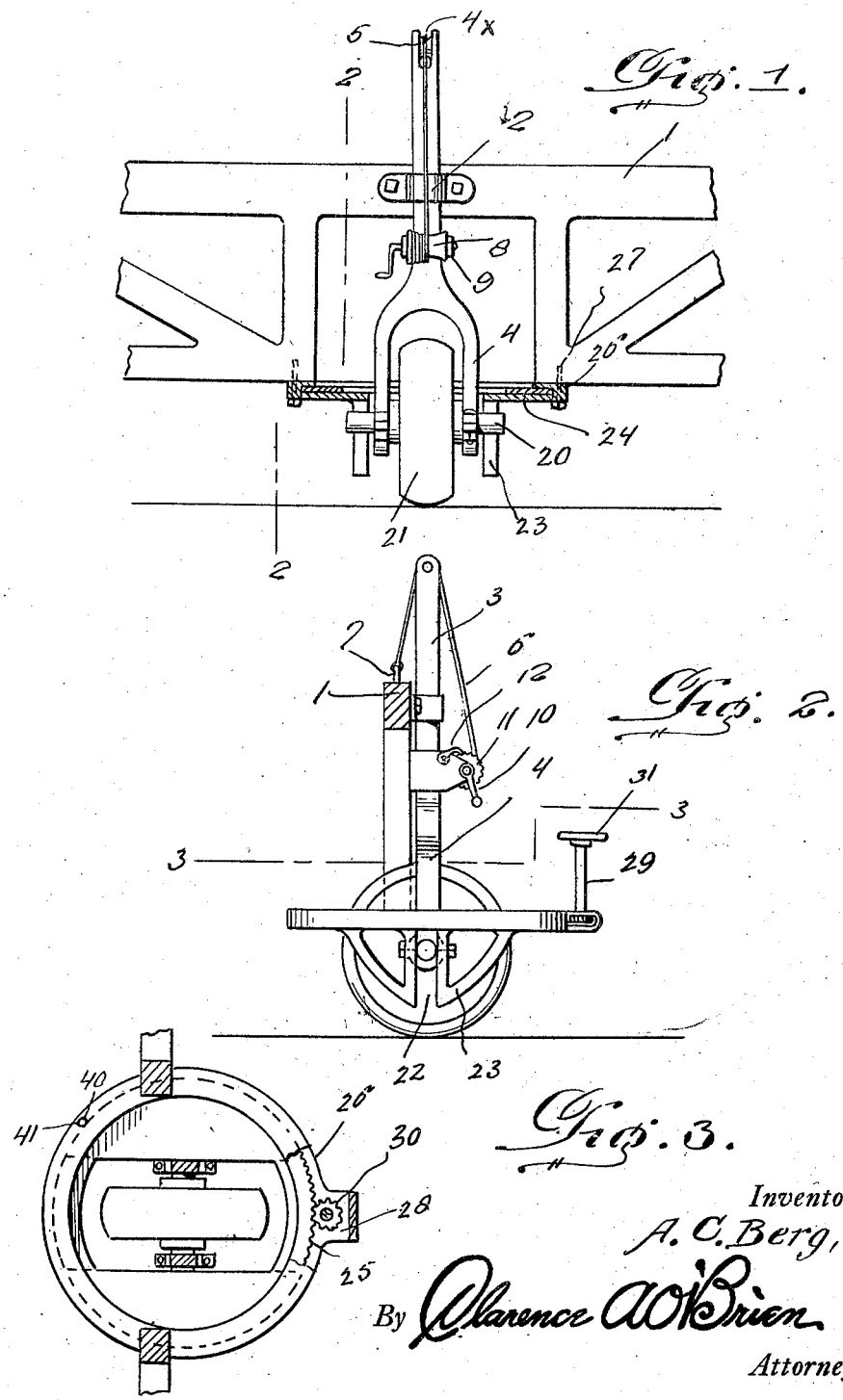

1,613,155

UNITED STATES PATENT OFFICE.

ALBERT C. BERG, OF CHEYENNE WELLS, COLORADO.

WHEELED SUPPORTING DEVICE.

Application filed December 28, 1925. Serial No. 77,992.

My present invention has to do with the movements of heavy machinery, and it contemplates the provision of a peculiar and advantageous wheeled support designed primarily to carry the weight of a sliding or skidding apparatus such as a snow plow when it is desired to move the same over a bare stretch of roadway or pavement.

My invention also contemplates the provision in a supporting device of the kind indicated of means whereby the supporting device may be utilized for the raising and for the maintenance in raised position of the machine, and may also be utilized for the guiding of the supporting machine as when it is desired to make a turn.

Other objects and practical advantages of the invention will be fully understood from the following description and claims when the same are read in connection with the drawings, accompanying and forming part of this specification, in which:—

Figure 1 is a view showing my improvement as associated with a portion of a machine to be supported, the improvement being partly in elevation and partly in section.

Figure 2 is a vertical section taken on the line 2—2 of Figure 1.

Figure 3 is a horizontal section taken in the plane indicated by the line 3—3 of Figure 2, looking downwardly.

Similar numerals of reference designate corresponding parts in all of the views of the drawings.

I show in Figures 1 and 2 a portion 1 of the frame of an apparatus which may be a snow plow or any other apparatus that it is desired to move.

For the association of my improvement with the said frame 1, the latter is provided at 2 with a bearing in which is disposed the shank 3 of the yoke 4 comprised in the improved device, the said shank 3 being of circle form in cross-section so as to permit of free movement of the same about its axis in the said bearing 2. The upper end of the shank 3 is bifurcated as designated by 4ˣ, and in the bifurcation is arranged a circumferentially grooved sheave 5. Trained over the said sheave 5 is a cable 6 one end of which is connected to the frame 1 as designated by 7. The other end of the cable 6 is connected to and designed to be wound upon a drum 8 mounted between arms 9 carried by the shank 3. The said drum 8 is equipped with a handle 10 and a ratchet disk 11, the latter for cooperation with a pawl 12 on one arm 9, while when the pawl is in normal position reverse turning of the drum 8 and the letting off of the cable 6 therefrom will be prevented. When, however, it is desired to pay the cable 6 off the drum 8 as when the frame 1 is to be lowered, it is simply necessary to throw the pawl 12 back out of engagement with the ratchet disk 11.

Carried in appropriate manner in the arms of the yoke 4 is a shaft 20 which in the preferred embodiment of my invention is fixed against rotation in the yoke. The end portions of the said shaft 20 extend outwardly beyond the arms of the yoke 4, and the portion of the shaft between the said arms is preferably comparatively large for the sake of strength and for the adequate carriage of a wheel 21. The wheel 21 is movable freely about the shaft 20, and it is within the purview of my invention to employ any appropriate means for the thorough lubrication of the wheel.

The extended end portions of the shaft 20 are arranged loosely in bifurcations 22 in hangers 23 on an annulus 24, the said annulus 24 being provided with peripheral spur gear teeth as designated by 25 and shown in Figure 3. The annulus 24 is arranged within a ring bearing 26 which is designed to be connected with the frame 1 through the medium of bolts or screws 27 or other appropriate means. The ring bearing 26 is arranged above the annulus 24 and hence there is no necessity of connecting the said elements 24 and 26, the weight of the latter being imposed on the former. The ring bearing 26 is provided at 28 with an offset, and in the said offset is journaled a shaft 29 on which is a spur gear 30, intermeshed with the teeth 25 of the annulus 24. The shaft 29 is also equipped with a hand wheel 31, and manifestly when the said shaft 29 is turned about its axis, the spur gear carrying annulus 24 will also be turned together with the wheel 21 and the yoke 4 in which the said wheel 21 is mounted. The turning mechanism just described is for the purpose of facilitating the making of turns with the apparatus supported by my improvement.

When it is desired to lock the annulus 24 against turning as when the supported apparatus is traversing a straight course, it is simply necessary for the operator or attendant to drop a key or pin 40 through an aperture 41 in the ring bearing 26, and so that the said pin or key will rest in one of the interdental spaces of the annulus 24 when it will be appreciated turning of the annulus 24 in the ring bearing or movement of the ring bearing 26 about the annulus 24 will be precluded.

It will also be readily understood from the foregoing that through the medium of my improvement the frame 1 of the apparatus may be raised with but little effort on the part of an operator and may be adjustably fixed at various heights within certain limits.

Notwithstanding the practical advantages of my improvement as set forth in the foregoing, it will be appreciated that the improvement is simple and inexpensive in construction, is susceptible of being readily applied to an apparatus to be supported, and is well adapted to withstand the shock and strain to which devices of corresponding character are ordinarily subjected.

The construction illustrated and described herein constitute the preferred embodiment of my invention and I have described the same in detail in order to impart a full, clear and exact understanding of the said embodiment. I do not desire, however, to be understood as confining myself to the specific construction and relative arrangement of the parts as disclosed, my invention being defined by my appended claims within the scope of which changes in structure and in relative arrangement may be made without departure from my invention.

Having described my invention, what I claim and desire to secure by Letters-Patent, is:—

1. A wheeled support comprising a ring bearing having an offset portion, a shaft mounted in said offset portion and equipped with a spur gear, a toothed annulus intermeshed with the said spur gear and having bifurcated hangers spaced apart, a yoke having a shank of circular cross-section, a drum carried by said yoke, a cable trained over a guide on the yoke shank and interposed between and connected to an apparatus to be supported and the said drum, and means for detachably securing the said drum against rotation; the said yoke carrying a wheel and being provided with lateral portions disposed in the bifurcations of the said hangers.

2. A wheeled supporting device comprising a ring bearing, a toothed annulus associated with said bearing and having pendent, spaced, bifurcated portions, a gear carried by the ring bearing for cooperation with said toothed annulus, a yoke having a shank of circular cross-section and also having a bifurcated upper end, a sheave mounted in the said bifurcation in the upper end of the shank, a drum carried by the yoke, a cable trained over said sheave and connected with said drum and adapted to be connected with an apparatus to be supported, means for detachably holding the drum against retrograde rotation, a wheel carried in the said yoke, and lateral portions on the yoke and disposed in the bifurcations in the pendent portion of the annulus.

3. A wheeled supporting device comprising a ring bearing, a toothed annulus associated with said bearing and having pendent, spaced, bifurcated portions, a gear carried by the ring bearing for cooperation with said toothed annulus, a yoke having a shank of circular cross-section and also having a bifurcated upper end, a sheave mounted in the said bifurcation in the upper end of the shank, a drum carried by the yoke, a cable trained over said sheave and connected with said drum and adapted to be connected with an apparatus to be supported, means for detachably holding the drum against retrograde rotation, a wheel carried in the said yoke, and lateral portions on the yoke and disposed in the bifurcations in the pendent portions of the annulus; the ring bearing being provided with a vertically disposed aperture for the reception of a locking pin when one of the interdental spaces of the toothed annulus is coincident with the said aperture.

In testimony whereof I affix my signature.

ALBERT C. BERG.